(12) United States Patent
Guckenberger et al.

(10) Patent No.: US 7,977,618 B2
(45) Date of Patent: Jul. 12, 2011

(54) TESTING OF TRANSIMPEDANCE AMPLIFIERS

(75) Inventors: John Andrew Guckenberger, Ithaca, NY (US); Young Hoon Kwark, Chappaqua, NY (US); Jeremy Daniel Schaub, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 12/545,320

(22) Filed: Aug. 21, 2009

(65) Prior Publication Data
US 2010/0045370 A1  Feb. 25, 2010

Related U.S. Application Data

(62) Division of application No. 10/736,424, filed on Dec. 15, 2003, now Pat. No. 7,745,775.

(51) Int. Cl.
*G01R 33/00* (2006.01)
(52) U.S. Cl. ............ 250/214 A; 330/2; 356/221; 257/48
(58) Field of Classification Search .............. 250/214 A, 250/214 R, 214.1; 356/221; 330/2, 59; 257/48; 327/514
See application file for complete search history.

(56) References Cited

U.S. PATENT DOCUMENTS

| | | | | |
|---|---|---|---|---|
| 5,585,731 | A * | 12/1996 | Tsuchida et al. | 324/537 |
| 6,624,405 | B1 | 9/2003 | Lau et al. | |
| 7,745,775 | B2 * | 6/2010 | Guckenberger et al. | 250/214 A |
| 2004/0188793 | A1 * | 9/2004 | Lindemann et al. | 257/457 |
| 2005/0103984 | A1 * | 5/2005 | Feng | 250/215 |

* cited by examiner

*Primary Examiner* — Seung C Sohn
(74) *Attorney, Agent, or Firm* — Anne Vachon Dougherty

(57) ABSTRACT

Testing is performed on an amplifier wafer housing a transimpedance amplifier prior to packaging the transimpedance amplifier with an external photodetector, wherein the transimpedance amplifier includes a small, auxiliary, integrated silicon photodetector provided at the input of the transimpedance, in parallel with external photodetector attachment points. To test the transimpedance amplifier, the transimpedance amplifier is stimulated by optically exciting the small auxiliary photodetector, wherein the small auxiliary photodetector is excited using short wavelength light, whereby advantages such as higher efficiency may be obtained. The testing method includes placing the amplifier wafer in a testing system, probing the power and ground connections on the amplifier wafer, illuminating the small auxiliary photodetector on the amplifier wafer, and detecting the output of the transimpedance amplifier housed on the amplifier wafer.

16 Claims, 10 Drawing Sheets

TESTING OF TRANSIMPEDANCE AMPLIFIERS

CROSS REFERENCE TO RELATED APPLICATIONS

This is a divisional application for U.S. patent application Ser. No. 10/736,424 filed Dec. 15, 2003.

The present invention relates generally to transimpedance amplifiers, and, more specifically, to semiconductor wafers housing the transimpedance amplifiers and wafer-level testing the transimpedance amplifiers prior to packaging the transimpedance amplifiers in optical receivers.

BACKGROUND

In an optical communication system, a transimpedance amplifier may be used to amplify an electrical current and convert the electrical current into a voltage. A transimpedance amplifier fabricated in silicon CMOS or bipolar technology, for example, may be provided in an optical receiver along with a photodetector.

FIG. 1 shows an exemplary embodiment of an optical receiver in an optical link. As shown in FIG. 1, an optical receiver 100 may comprise of a photodetector 300, and a transimpedance amplifier 400 connected to the photodetector 300 via wirebonds 210.

As shown in FIG. 1, the photodetector 300 receives optical input and converts the light to a proportional photocurrent. The photocurrent is input to the transimpedance amplifier 400 via an electrical connection 210, where it is converted to a peak-to-peak voltage Vout that is conditioned and amplified.

As a current trend, optical receivers are widely used in optical links. Many optical links operate at wavelengths of 1.3 um or 1.55 um using single mode optical fiber. Optical links may be manufactured at lower costs using multimode fiber and using a wavelength of 0.85 um. In these optical links, the requirements of the photodetectors in the optical receiver include, for example:

high speed, of typically 1-10 Gb/s;
high quantum efficiency of greater than 75%;
large area of 50-75 um diameter, since the core diameter of multimode fiber is 50 um or 62.5 um; and
low bias voltage of 2-5V.

Given the large absorption length of silicon at a wavelength of 0.85 um, and since silicon is not sensitive to the single-mode fiber wavelengths of 1.3 um and 1.55 um, it is extremely difficult for a silicon photodetector to meet all of the requirements for operating in an optical link. For example, since all CMOS and bipolar processes fabricate the active devices very close to the semiconductor surface, such as within 1.0 um, it is difficult to maintain a high quantum efficiency of greater than 75%.

Accordingly, in optical receivers, photodetectors may be fabricated from materials other than silicon. In such cases, the transimpedance amplifier and the photodetector are fabricated separately, and then packaged together with wirebonds or flip-chip attachment after fabrication in the amplifier circuit.

FIG. 2 shows an exemplary embodiment of a transimpedance amplifier for use in optical receivers where the transimpedance amplifier and the photodetector are fabricated separately. As shown in FIG. 2, the transimpedance amplifier 2000 comprises a substrate 200, and power supply 500, and ground 600, and amplifier circuit 400 formed on the substrate 200. Further, as shown in FIG. 2, a photodetector wiring bond pad 100 for wirebonds or flip-chip attachment to the photodetector after fabrication is also fabricated on the transimpedance amplifier 2000.

In these embodiments, at least due to a lack of high speed current sources to drive the input of the transimpedance amplifier, the transimpedance amplifier 2000 is not tested at high speed until it is diced and packaged with a photodetector. In addition, because one and two dimensional arrays of optical receivers in new packaging technologies, such as silicon carrier, may produce individual contact pads as small as 15 um diameter on a pitch of 30 um, and since high speed probes are typically limited to a minimum pitch of 50-100 um, wafer level probing of the high speed output signals may become extremely difficult. Therefore, the transimpedance amplifier 2000 is tested after being packaged with a photodetector. Deferring testing to this stage of fabrication is undesirable since fallout of parts at this stage may be very costly.

SUMMARY OF THE INVENTION

In accordance with the exemplary aspects of this invention, a testing system is provided for testing a transimpedance amplifier separately fabricated from a standard III-IV photodetector.

In accordance with the exemplary aspects of this invention, testing is performed on an amplifier wafer housing the transimpedance amplifier prior to packaging the transimpedance amplifier with an external photodetector. In accordance with these exemplary aspects, the transimpedance amplifier may comprise an amplifier circuit and a photodetector wirebond pad for attachment to the external photodetector.

In accordance with various exemplary aspects of this invention, a small, auxiliary, integrated silicon photodetector is provided at the input of the transimpedance amplifier on the amplifier wafer, in parallel with external photodetector attachment points.

In accordance with these exemplary embodiments, the small auxiliary photodetector provided on the amplifier wafer does not significantly affect the high speed performance of the transimpedance amplifier after the transimpedance amplifier is packaged with an external photodetector on the photodetector wirebond pad.

In accordance with these exemplary embodiments, at least one small auxiliary photodetector is provided at the input of the transimpedance amplifier to provide protection from electro-static discharge during handling, for example.

In accordance with the exemplary aspects of this invention, the cost of testing a separately fabricated transimpedance amplifier, which may be costly in the prior art when compared to a monolithic design, may be decreased. That is, in accordance with these exemplary aspects, advantages such as decrease in cost may be obtained by testing the transimpedance amplifier at the wafer level, rather than after the transimpedance amplifier is packaged with an external photodetector.

In accordance with the various exemplary embodiments of the present invention, contact-less methods are provided to test the transimpedance amplifier to verify operation of the transimpedance amplifier.

In accordance with the various exemplary embodiments of the present invention, the small auxiliary photodetector is provided to facilitate contact-less probing at the transimpedance amplifier input.

In accordance with the various exemplary embodiments of the present invention, to test the transimpedance amplifier, the transimpedance amplifier is stimulated by optically exciting the small auxiliary photodetector.

In accordance with the various exemplary embodiments of this invention, the small auxiliary photodetector is excited using short wavelength light, whereby advantages such as efficiency increase may be obtained.

In accordance with the various exemplary embodiments of the present invention, various testing methods are provided, comprising inserting the amplifier wafer in a testing system, probing the power and ground connections on the amplifier wafer, illuminating the small auxiliary photodetector on the amplifier wafer, and detecting the output of the transimpedance amplifier housed on the amplifier wafer.

In accordance with an exemplary embodiment of the present invention, the output of the transimpedance amplifier is detected by probing the supply voltage and detecting the switching currents passing through a bias tee using a spectrum analyzer.

In accordance with another exemplary embodiment of the present invention, the output of the transimpedance amplifier is detected using a high gain antenna and a sensitive narrow band receiver.

In accordance with an exemplary embodiment of the present invention, the output of the transimpedance amplifier is detected using a high speed electrical probe by either direct contact or capacitive proximity coupling.

DETAILED DESCRIPTION OF THE INVENTION

Figure 1:
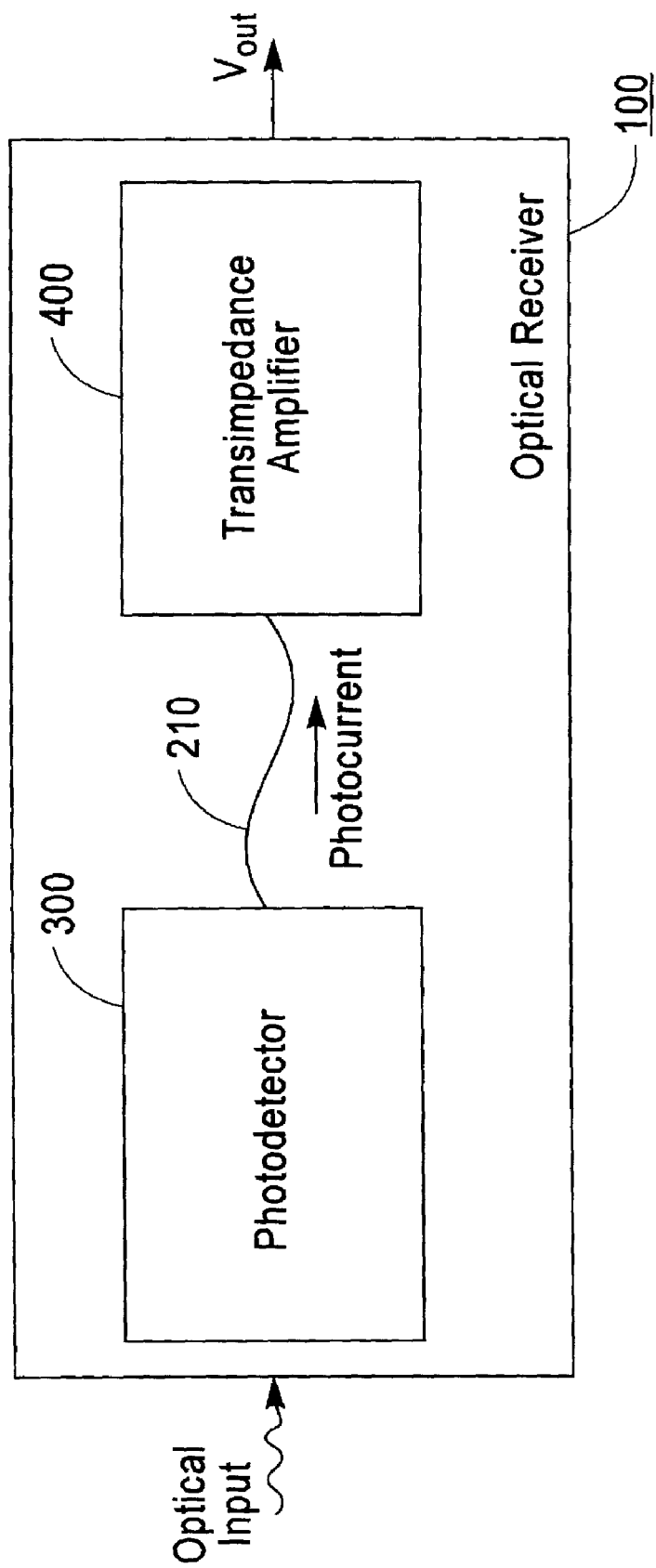
FIG. 1 shows an exemplary optical receiver.
Figure 2:
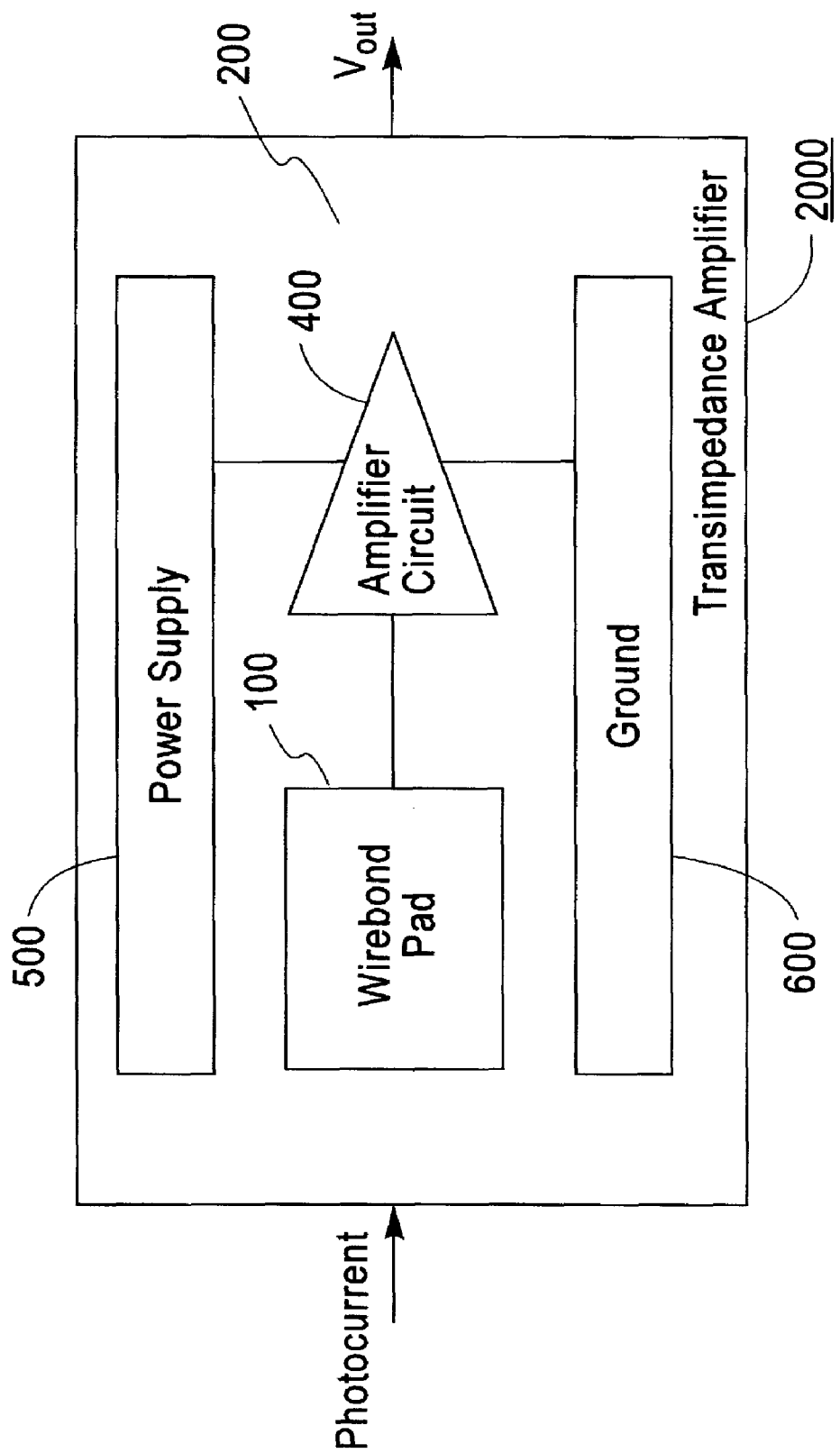
FIG. 2 shows an exemplary transimpedance amplifier.

The following description details how exemplary aspects of the present invention are employed. Throughout the description of the invention, reference is made to FIGS. 3-10. When referring to the figures, like structures and elements shown throughout are indicated with like reference numerals.

Figure 3:
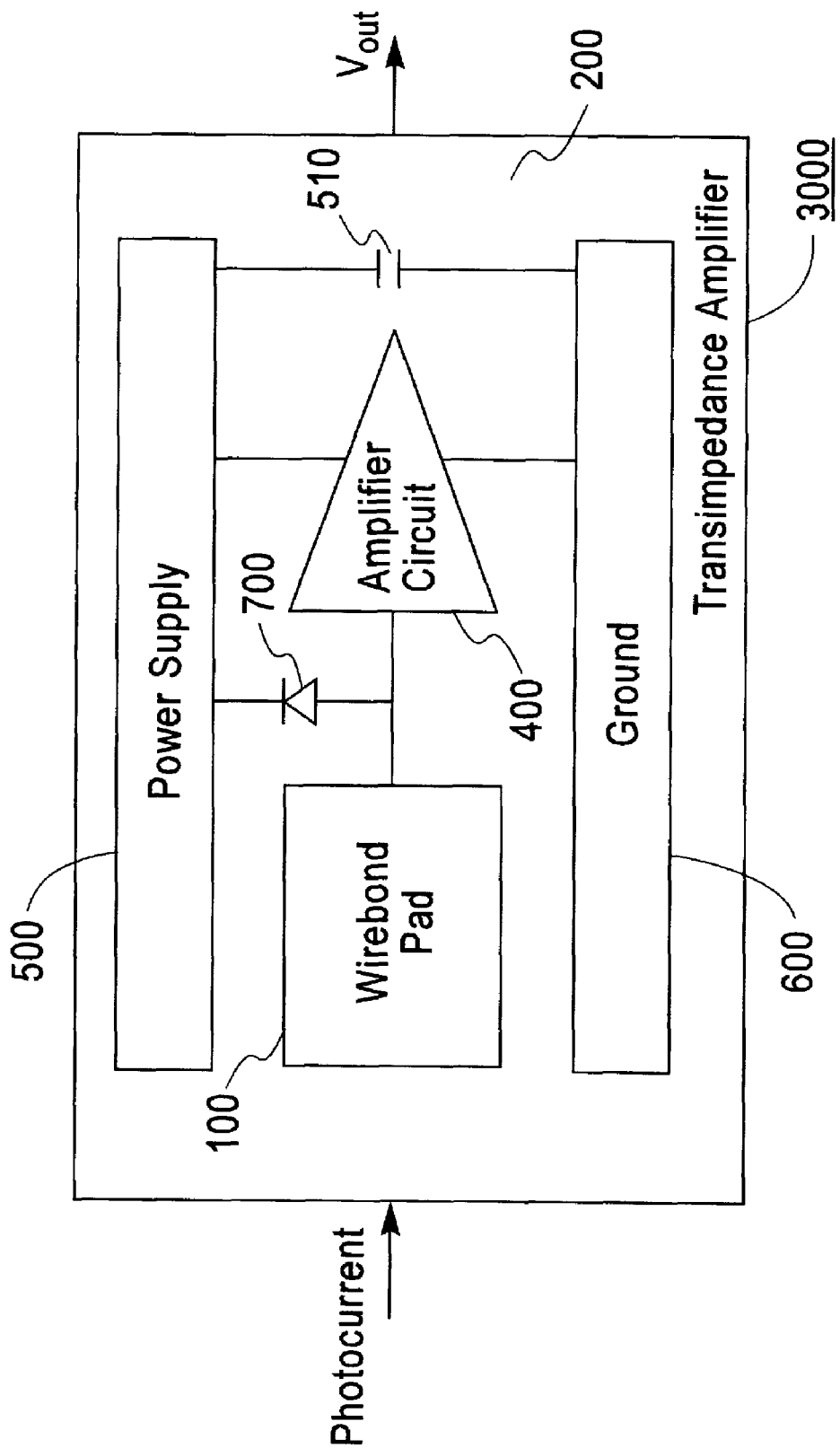
FIG. 3 shows an exemplary transimpedance amplifier embodying the exemplary aspects of the present invention.

In FIG. 3, an exemplary transimpedance amplifier embodying the exemplary aspects of the present invention is shown. As shown in FIG. 3, an amplifier circuit 400 is fabricated on the substrate 200 of the transimpedance amplifier 3000 along with power supply 500 and ground 600. As shown in FIG. 3, the transimpedance amplifier 3000 further comprises an on-chip power decoupling capacitor 510 which provides high frequency currents to the amplifier circuit 400 in addition to the high frequency currents provided from external sources, and a photodetector wiring bond pad 100 for wirebonds or flip-chip attachment to an external photodetector after fabrication. Further, in accordance with an exemplary embodiment of the present invention, a small auxiliary photodetector 700 is provided between the photodetector wirebond pad 100 and the power supply 500. As shown in FIG. 3, the small auxiliary photodetector 700 is provided at the input of the transimpedance amplifier in parallel with attachment points to an external photodetector.

Though FIG. 3 shows that the decoupling capacitor 510 comprises a single capacitor, it should be appreciated this configuration is merely for illustration purposes only. That is, in accordance with the various exemplary aspects of this invention, the decoupling capacitor may consist of a plurality of capacitors, and that this invention is not limited to the shown single capacitor for providing high frequency currents to the amplifier circuit 400.

In various exemplary embodiments, an external photodetector (not shown) is to be packaged with the transimpedance amplifier 3000 after fabrication by wirebonds or flip-chip attachment on the photodetector wiring bond pad 100 to form an optical receiver. In these various exemplary embodiments of the present invention, the small auxiliary photodetector 700, though fabricated on the transimpedance amplifier 3000 with the amplifier circuit 400, will only be used to test the amplifier wafer and does not affect normal operation of the optical receiver. That is, the small auxiliary photodetector 700 does not significantly affect the high speed performance of the transimpedance amplifier 3000 packaged with an external photodetector, and that the primary function of the small auxiliary photodetector 700 is to provide a method for testing the transimpedance amplifier at the wafer level, before it is diced and packaged with the external photodetector.

It is initially noted that the transimpedance amplifier 3000 of FIG. 3 is presented for illustration purposes only, and is representative of countless configurations in which the exemplary aspects of the present invention may be implemented. Thus, the present invention should not be considered limited to the system configuration shown in the figure.

For example, it should be appreciated that though the exemplary embodiment above shows a transimpedance amplifier 3000 used in an optical receiver, the amplifier circuit may also be used in a number of systems known in the art which require an electrical current as an input. Thus, it is contemplated that the amplifier circuit may be configured and may include various topologies and protocols known to those skilled in the art, while including a small auxiliary photodetector provided between the input pad and the input of the amplifier circuit.

In accordance with the various exemplary embodiments of the present invention, the substrate 200 of the transimpedance amplifier 3000 may be fabricated from materials such as silicon, silicon-on-insulator, gallium arsenide, indium gallium arsenide, and indium phosphide. However, it should be appreciated that the exemplary aspects of the present invention is not limited to only these materials, and that other substrates may also be used in this invention.

Further, the amplifier circuit 400 of the transimpedance amplifier 3000 may include one of a metal oxide semiconductor circuit, a metal semiconductor circuit, a bipolar junction transistor circuit, and a heterojunction bipolar transistor circuit. However, it should be appreciated that the exemplary aspects of the present invention is not limited to only these circuit, and that other amplifier circuits may also be used in this invention.

In accordance with the various exemplary embodiments of the present invention, external photodetectors to be bonded to the photodetector bonding pad 100 are fabricated from materials with an absorption region of III-V semiconductors, such as GaAs or InGaAs, having a performance that is superior to that of silicon photodetectors at optical communication wavelengths. Furthermore, the requirements of the photodetectors in the optical links, including high speed (1-40 Gb/s), high quantum efficiency (>75%), large area (50-75 um diameter), and low bias voltage (2-5V) may be obtained.

It should be appreciated that the small auxiliary photodetector 700 in accordance with various exemplary embodiments of the present invention may be an integrated silicon photodetector fabricated in standard CMOS, CMOS on SOI, or BiCMOS technology. However, it should be appreciated that the present invention is not limited to such technology, and may also be extended to other semiconductor technologies, such as GaAs MESFET and InP HBT.

In the various exemplary embodiments of the present invention, since the small auxiliary photodetector 700 will only be used to test the transimpedance amplifier 3000, the requirements for large area and high efficiency for a photodetector may be relaxed. Further, the small auxiliary photodetector may be excited using a source with a shorter wavelength than 0.85 um, which may improve the performance of the amplifier circuit since the absorption coefficient increases at shorter wavelengths.

Thus, by providing the small auxiliary photodetector 700 in the transimpedance amplifier 3000, during testing, optical packaging requirements, for example, may be circumvented. For example, optics may be designed for long working distance as well as small spot focus size, and thus, the long distance permits use of an optical beam splitting column such that existing wafer prober technology may be used.

In accordance with the various exemplary embodiments of the present invention, the small auxiliary photodetector 700 may be a P-N photodiode, a P-I-N photodiode, a metal-semiconductor-metal photodetector, or an avalanche photodetector. However, it should be appreciated that the exemplary aspects of the present invention is not limited to only these photodetectors, and that other photodetectors which provides the above described features may also be used in this invention.

Figure 4:
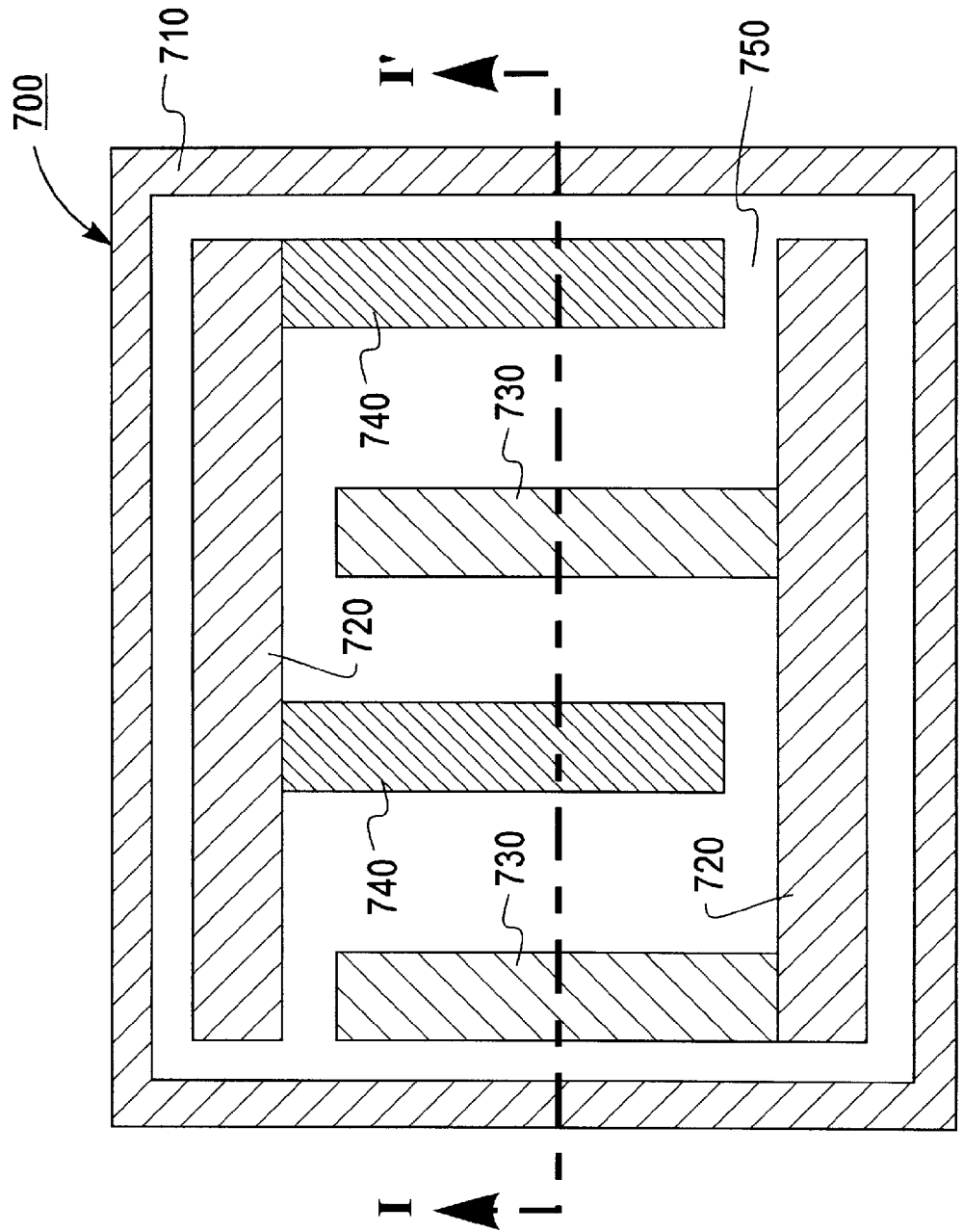
FIG. 4 shows a top view of an exemplary auxiliary photodetector embodying the exemplary aspects of the present invention.
Figure 5:
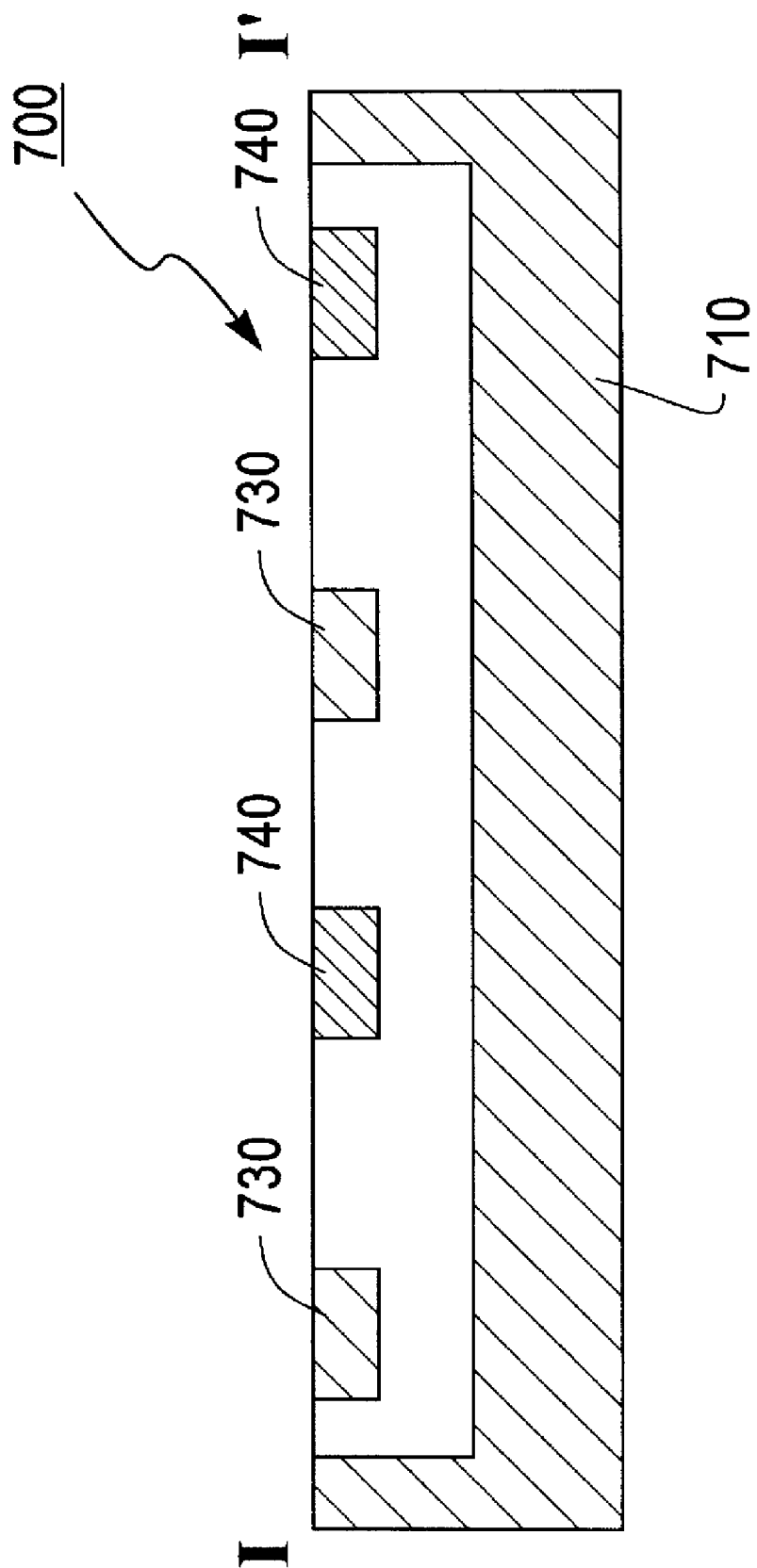
FIG. 5 shows a cross sectional view of the auxiliary photodetector of FIG. 4 along line I-I'.

FIGS. 4 and 5 illustrate an exemplary embodiment of a small auxiliary photodetector embodying the exemplary aspects of the present invention. In particular, FIG. 4 shows a sectional view of an auxiliary photodetector 700 while FIG. 5 shows a cross view of the small auxiliary photodetector of FIG. 4 along line I-I'.

As shown in FIGS. 4 and 5, auxiliary photodetector 700 may be an integrated silicon photodetector comprising of lateral, interdigitated p+ fingers 730 and n+ fingers 740, metal pads 720 provided at one end of the p+ and n+ fingers 730 and 740, and a p-substrate 710 enclosing the entire auxiliary photodetector 700, wherein an n-well 750 is created within the p-substrate 710 around the p+ fingers 730 and the n+ fingers 740. The metal pads 720 serve to connect the photodetector 700 to power supply 500 and inputs of an amplifier circuit 400 (FIG. 3).

In operation, when the auxiliary photodetector 700 is excited, photons are absorbed in the lightly doped n-well 750 and are converted to electrons and holes. A positive bias voltage is applied to the n+ fingers 740 with respect to the p+ fingers 730. The electrons and holes drift due to the electric field and are collected by the n+ fingers 740 and p+ fingers 730, respectively. The pn junction formed between the n-well 750 and p-substrate 710 then serve to block the slow carriers that are absorbed deep below the surface of the auxiliary photodetector 700.

It is initially noted that the auxiliary photodetector 700 of FIGS. 4-5 is presented for illustration purposes only, and is representative of countless configurations in which the exemplary aspects of the present invention may be implemented. Thus, the present invention should not be considered limited to the system configuration shown in the figures.

For example, it should be appreciated that though the exemplary embodiment above shows the auxiliary photodetector 700 having two p+ fingers 730 and two n+ fingers 740, the auxiliary photodetector 700 may comprise any number of fingers. That is, the auxiliary photodetector 700 may be any photodetector in the art for photodetection, provided that it does not affect the high speed performance of the amplifier circuit 400. In particular, the auxiliary photodetector 700 is to have low capacitance when compared with the capacitance of the III-V photodetector.

Further, though FIGS. 4-5 show the auxiliary photodetector 700 in a particular topology, it is contemplated that the auxiliary photodetector 700 may be configured and may include various topologies and protocols known to those skilled in the art, while providing the function of converting an optical signal into an electrical signal.

Figure 6:
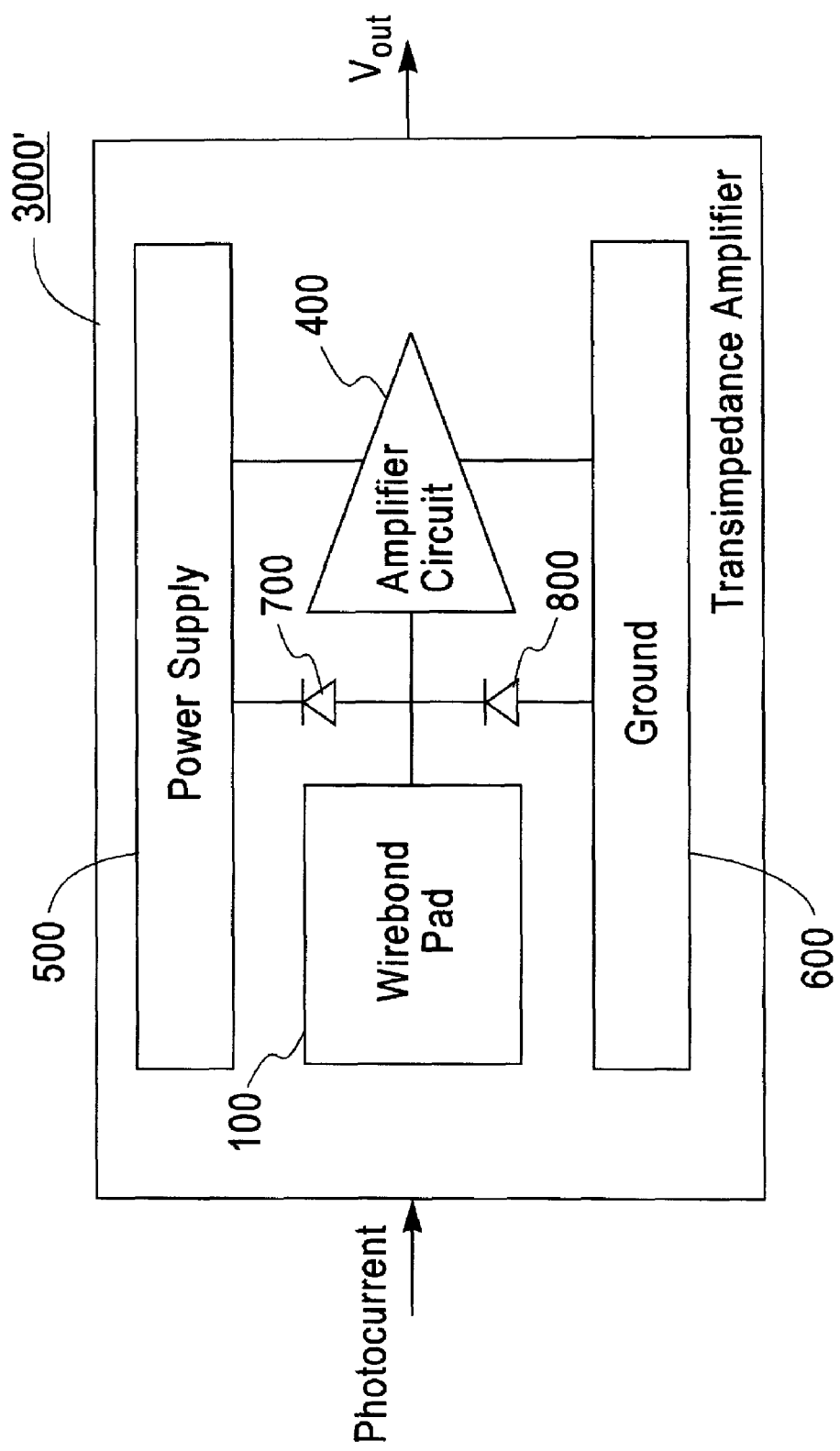
FIG. 6 shows another exemplary transimpedance amplifier embodying the exemplary aspects of the present invention.

Furthermore, though FIG. 3 shows the transimpedance amplifier 3000 having a single auxiliary photodetector 700, it is contemplated that a plurality of auxiliary photodetectors may be configured in accordance with the various aspects of this invention. For example, FIG. 6 shows another exemplary transimpedance amplifier embodying the exemplary aspects of the present invention. In accordance with the exemplary embodiment of FIG. 6, advantages such as on-wafer transimpedance amplifier testing and electro-static discharge protection may be provided.

As shown in FIG. 6, transimpedance amplifier 3000' comprises a first auxiliary photodetector 700 and a second auxiliary photodetector 800. In the transimpedance amplifier 3000', the first auxiliary photodetector 700 is connected between the power supply 500 and the input of the amplifier circuit 400, and the second auxiliary photodetector 800 is connected between the input of the amplifier circuit 400 and ground 600.

It is to be appreciated that the structure of the exemplary transimpedance amplifier 3000' in FIG. 6 is similar to the structure of the standard electro-static discharge diodes used in the CMOS process, wherein standard electro-static discharge diodes are often used on a bias or signal line to prevent damage to the circuit when a static charge is inadvertently applied to the bonding pad. In this exemplary embodiment of FIG. 6, the first and second auxiliary photodetectors 700 and 800 are diodes. Thus, if a large electrostatic charge of positive polarity appears at the input pad of the transimpedance amplifier 3000', the first auxiliary photodetector 700 as the top diode will become forward biased and will conduct the charge to the power supply 500, thus bypassing and protecting the amplifier circuit 400. Similarly, a large electrostatic negative charge will forward bias the second auxiliary photodetector 800 as the bottom diode, and the charge will be conducted to ground 600.

In accordance with this exemplary embodiment, with slight modification to the configuration of the transimpedance amplifier 3000', the auxiliary photodetectors 700-800 may detect light with the selective illumination of the auxiliary photodetectors 700-800 using the steerable focused beam test configuration.

In accordance with the various exemplary embodiments described above, after the transimpedance amplifier is tested, it may be packaged with a standard III-V photodetector for normal amplifier circuit operation, such as in an optical receiver. Since the auxiliary photodetector is small, the parasitic capacitance needs to be low enough not to significantly degrade the hybrid performance. For example, an auxiliary photodetector with an active area of 20 um×20 um would add a parasitic capacitance of only 20 fF to the amplifier circuit.

Further, it is to be appreciated that this testing method may be applied to transimpedance amplifiers that are intended for both multimode, i.e. 0.85 um, and single-mode, i.e. 1.3 um or 1.55 um, optical links. It is also to be appreciated that the exemplary testing methods of this invention may be applied to both single-ended and differential transimpedance amplifier designs.

When testing at wafer level, in addition to the requirement of targeted illumination, high speed probing requirements also require careful consideration. Increasing areal density requirements may dictate that the individual transimpedance amplifier sizes be decreased into an area of only 250 um×250 um or less. In new packaging technologies, such as silicon carrier, for example, individual contact pads may be as small as 15 um diameter on a pitch of 30 um. These small dimensions are desirable since it allows more room for the layout of the individual transimpedance amplifier within the 250 um×250 um amplifier cell. Accordingly, there is a need to provide a method of detecting the functionality of the transimpedance amplifier without directly contacting the high speed outputs of the transimpedance amplifier, since the high speed probes are typically limited to a minimum pitch of 50-100 um.

In accordance with the various exemplary embodiments of this invention, by providing the auxiliary photodetector to the transimpedance amplifier and using the methods described below, contact-less testing may be performed to verify operation of the amplifier circuit. The auxiliary photodetector may be used to stimulate the input of the amplifier circuit without directly contacting the amplifier wafer housing the transimpedance amplifier.

Figure 7:
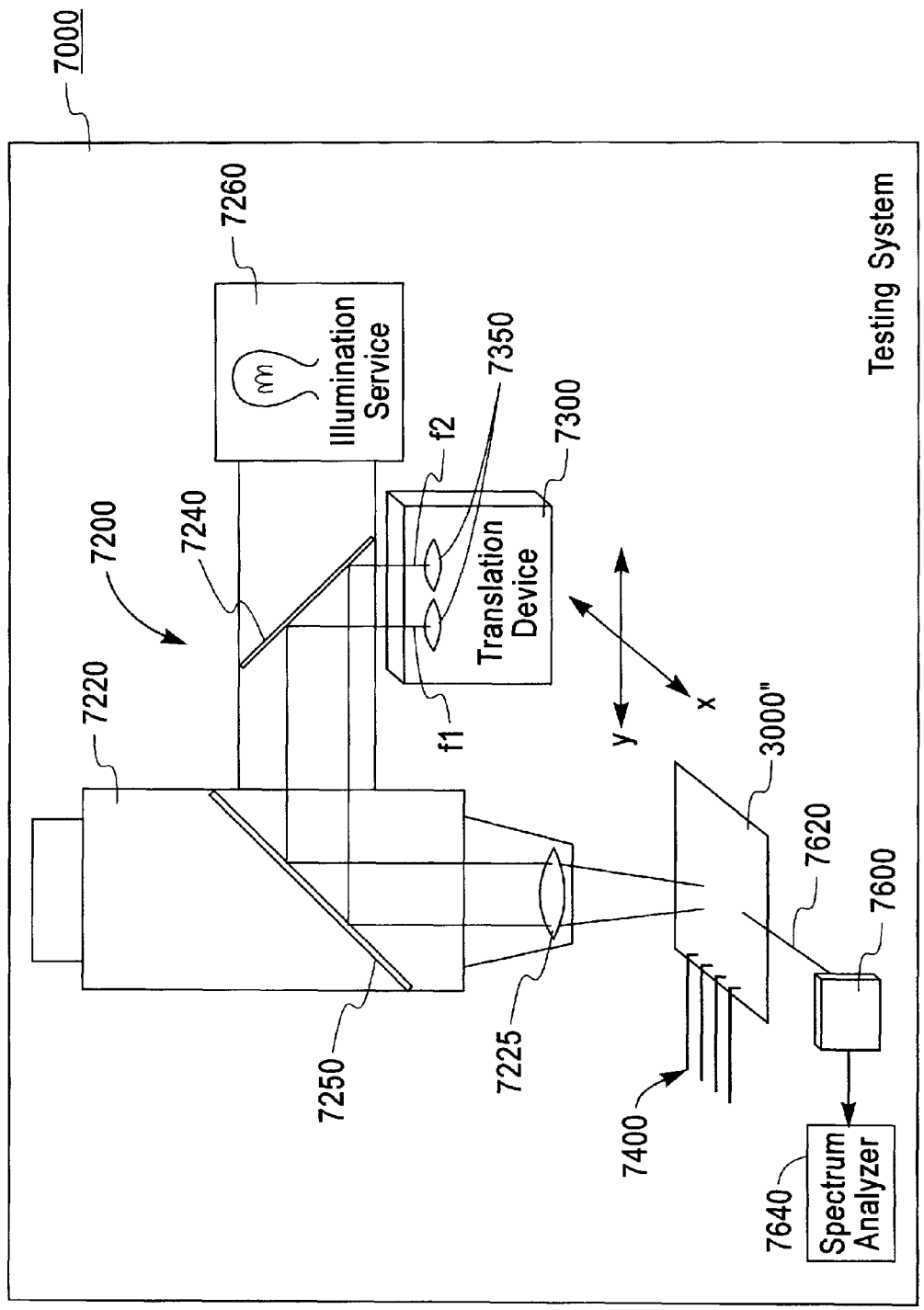
FIG. 7 shows an exemplary testing system embodying the exemplary aspects of the present invention.
Figure 8:
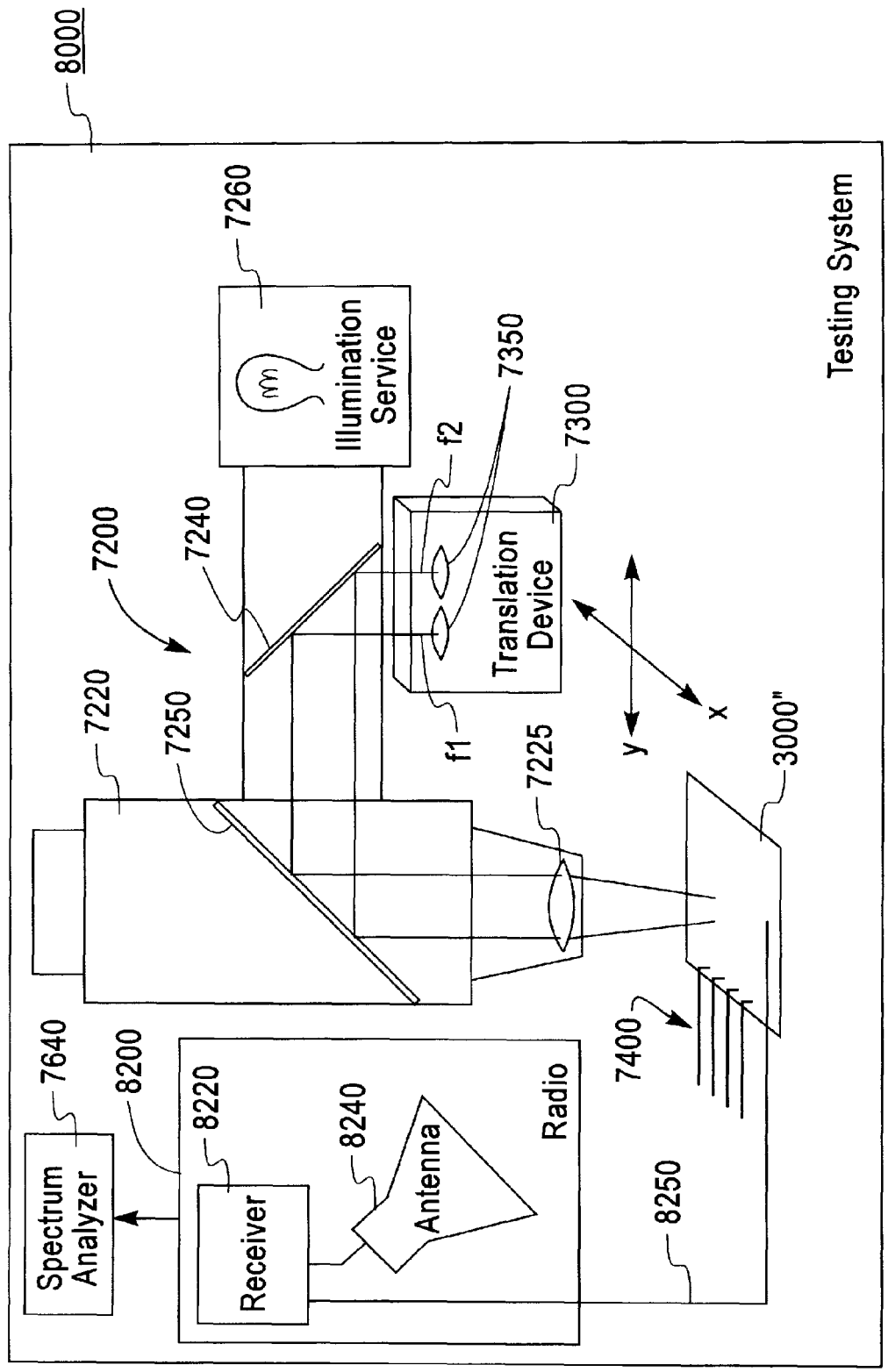
FIG. 8 shows another exemplary testing system embodying the exemplary aspects of the present invention.
Figure 9:
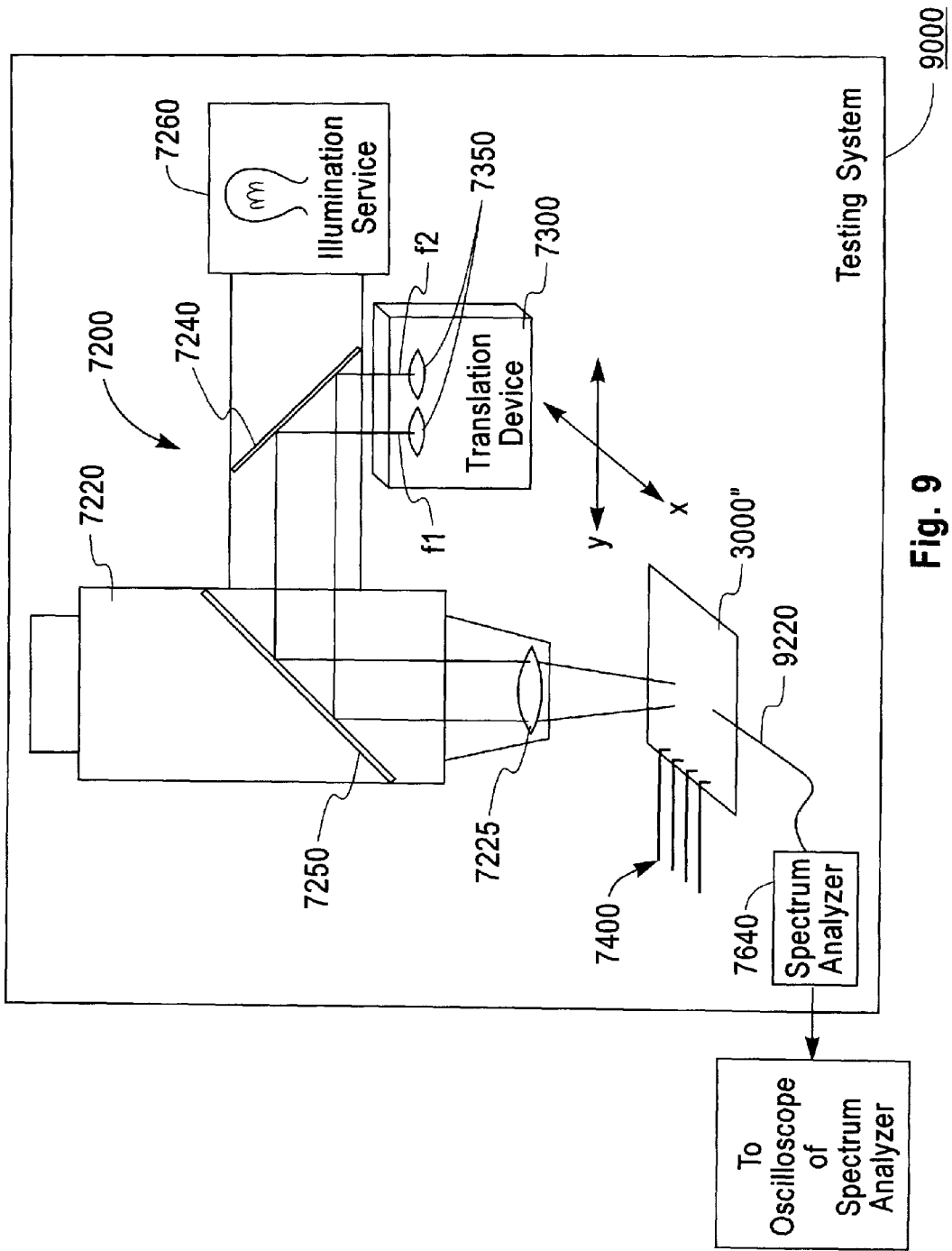
FIG. 9 shows yet another exemplary testing system embodying the exemplary aspects of the present invention.

FIGS. 7-9 show various exemplary testing systems in accordance with the various aspects of the present invention.

As shown in FIGS. 7-9, a testing system 7000-9000 may be comprised of an illumination system 7200 including microscope column 7220, beam splitters 7240 and 7250, microscope objective 7225 and illumination source 7260, an ancilliary optical system 7350 for collimating laser beams to be provided to the illumination system 7200, a mechanical translation device 7300 that translates the collimated laser beams in the X-Y directions, and needle probes 7400 for supplying power and control to an amplifier wafer 3000" housing the transimpedance amplifier to be tested. As shown in FIGS. 7-9, laser beams f1 and f2 are collimated by the ancillary optical system 7350 and mounted on mechanical translation stages of the mechanical translation device 7300 that permit scanning in the X-Y directions. It should be appreciated that a scanning mirror or mirror array may be included to provide an equivalent scanning capability to the laser beams. Laser beams f1 and f2 may be modulated at high data rates by modulation sources (not shown). The laser beams f1 and f2 are deflected by the beam splitters 7240 and 7250 so that they are focused by the microscope objective 7225 and impinge on the amplifier wafer 3000".

It should be appreciated that although two laser beams f1 and f2 are shown in the exemplary embodiments of FIGS. 7-9, other configurations encompassing a single beam geometry or a multiplicity of beams each of which may be independently steered or gang steered by the mechanical translation device 7300 are possible in accordance with the exemplary aspects of this invention. It should be appreciated that any number of such independently focused and steered beams may be applied in the various aspects of this invention.

In accordance with the various exemplary aspects of this invention, contact-less testing systems 7000-9000 of FIGS. 7-9 are provided to verify operation of a transimpedance amplifier. In these exemplary embodiments, the laser beams f1 and f2 may be scanned across the transimpedance amplifier on the amplifier wafer 3000" without moving other components of the test fixture such as the needle probes and the like. That is, the laser test beams may be independently positioned and focused to impinge on the small auxiliary photodetector without moving the other components. This has advantages for testing throughput since the time required to scan the laser beam is much less than the time required to mechanically reposition probes 7400.

Though FIGS. 7-9 show that the testing is performed on an amplifier wafer comprising a single transimpedance amplifier, it should be appreciated this configuration is merely for illustration purposes only. That is, in accordance with the various exemplary aspects of this invention, the amplifier wafer 3000" may consist of repeated reticles each containing a single transimpedance amplifier or an integrated array of such transimpedance amplifiers.

In the exemplary embodiments shown in FIGS. 7-9, one of the beams f1 may be modulated at a first frequency by a first modulation source (not shown), and the other of the beams f2 may be modulated by a second modulation source (not shown) at a second frequency which may be different from the first frequency. In the various exemplary aspects of this invention, beams having different frequencies while still being within the passband of the transimpedance amplifier may be applied to facilitate examination of mixing products and cross-talk, for example. In these various exemplary embodiments of testing systems, the output of the amplifier wafer 3000" may be detected using a variety of methods.

FIG. 7 shows an exemplary testing system, wherein the output of the amplifier wafer 3000" may be indirectly detected. As shown in FIG. 7, testing system 7000 further comprises a bias-tee 7600 to monitor the RF signature of the activity on a selected power supply of the transimpedance amplifier on the amplifier wafer 3000", a probe 7620 for providing additional power to the amplifier wafer 3000", and a spectrum analyzer 7640.

In this exemplary embodiment, a high bandwidth connection may be established through the bias-tee 7600 to the probe 7620. The probe 7620 provides power to the amplifier wafer 3000" through the bias tee 7600. This power connection may differ from the power connection provided by the probes 7400 in that it requires more ripple current when the amplifier circuit is operational. In an exemplary embodiment, the power connection is provided to the output drivers of the transimpedance amplifier on the amplifier wafer 3000". It should be appreciated that, in a simpler test configuration, the power connections included in the probes 7400 may be subsumed in the power connection provided by the probe 7620. However, since the bias tee 7600 is often limited in the total amount of DC current that may be provided before compromising the RF choke that is usually present in bias tees, in this exemplary embodiment, the power is separated into the separate connections provided by the 7400 and 7620 probes.

In the exemplary embodiment of FIG. 7, on the amplifier wafer 3000", the amplifier circuit 400 (FIG. 3) is stimulated by the ancillary integrated photodetector 700, and the connections at the power supply 500 and ground 600 connecting to the probes 7620 and 7400 may be located on large pads at the perimeter of the amplifier wafer 3000". It should be appreciated that these pads may be the same pads that supply power to the power supply 500 and/or control in the final product, or may be sacrificial pads that may be diced off or left unused e.g. in the case of a flip chip mounting configuration. That is, the various aspects of the present invention are not limited to a particular type of pad.

The bias-tee 7600 then outputs the RF ripple currents to a spectrum analyzer 7640. During normal operation of the amplifier circuit 400, unbalanced RF currents must be provided by the power supply network. The unbalanced RF currents may be provided by local on-chip decoupling capacitors 510 (FIG. 3), with a fraction provided by the external power supply connection such as through probe 7620. The spectrum analyzer 7640 connected to the high frequency signal port of the bias tee 7600 may, by means of its large dynamic range, detect even very small RF signatures emanating from the power connection to probe 7620. The RF signature from this power connection has a characteristic harmonic signature or power spectral density that is unique to the amplifier circuit under test. The expected variances in circuit fabrication, bias tee transmission and probing variability may be accounted for to create a simple pass/fail test. To facilitate this detection and to minimize probing variability, the probe 7620 may be constructed using RF probe techniques that are readily available.

If the signal reaching the bias tee 7600 is too small to exceed the noise floor of the spectrum analyzer 7640, test frequency may be lowered to a point that the effectiveness of the on-chip decoupling capacitors 510 is no longer sufficient to mask the RF currents needed on the power supply connection to probe 7620.

FIG. 8 shows another exemplary testing system, wherein the activity of the transimpedance amplifier on the amplifier wafer 3000" may be detected. As part of normal amplifier operation, RF currents are present on many of the signal conductors in the amplifier circuit of the transimpedance amplifier. These RF currents excite electromagnetic fields that radiate away from the amplifier wafer 3000", and may be detected remotely with a sensitive radio. This radiation efficiency is normally quite small, but the option exists of selectively patterning some of the conductor lines in the amplifier circuit to enhance this radiation efficiency. In this exemplary embodiment, the option exists of cutting these ancillary structures after testing is completed if they compromise circuit performance. In the exemplary embodiment shown in FIG. 8, the testing system 8000 further comprises a radio 8200, and probe 8250.

As shown in FIG. 8, the radio 8200 comprises a sensitive narrow band receiver 8220, and a directional high gain antenna 8240. In this exemplary embodiment, the directional antenna 8240 provides a long working distance to the amplifier wafer 3000". Providing a long working distance provides the advantage of utilizing conventional wafer probers to test the amplifier wafers since the proximity of the amplifier wafer is already occupied by probe cards and optics.

In accordance with the various exemplary aspects of this invention, in an alternative exemplary embodiment, if the radiation efficiency of the conductor traces on the amplifier wafer 3000" is not sufficient to utilize the directional antenna 8240, proximity capacitive coupling to the electromagnetic fields excited by the outputs of the transimpedance amplifier housed on the amplifier wafer 3000" as depicted by the probe 8250 may be used. In this configuration, the probe 8250 is placed in close proximity of several microns or less above the surface in the proximity of the transimpedance amplifier output. The capacitive coupling that results from the placement of the probe 8250 may substitute for the high gain antenna 8240.

Discrete frequencies may be used to amplitude modulate the laser beams f1 and f2 with modulation sources. This amplitude modulation of the laser beams f1 and f2 may be accomplished by direct electrical modulation of the laser current and is a common technique. The discrete frequencies permit very narrow bandpass filtering on the receiver 8220 to increase sensitivity. It should be appreciated that shielding may be provided to protect the radio 8200 against RF leakage from the optical column with the modulating laser. The output of the receiver 8220 is fed to a spectrum analyzer 7640 which serves the same function as described previously in conjunction with the power probe 7620 detection scheme depicted in FIG. 7.

FIG. 9 shows yet another exemplary testing system, wherein the outputs of the transimpedance amplifier on the amplifier wafer 3000" are directly probed. As shown in FIG. 9, the testing system 9000 further comprises a high speed probe 9220. In this exemplary embodiment, the testing system 9000 is similar to the testing system 7000 of FIG. 7, but in place of the bias tee 7600 and the probe 7620 of FIG. 7, in the exemplary embodiment of FIG. 9, the power supply to the amplifier wafer 3000" is fed exclusively through the probes 7400. The output of the transimpedance amplifier housed in the amplifier wafer 3000" is brought out to probe-able pads and is contacted by the high speed probe 9220. The output of the high speed probe 9220 may be fed into either a spectrum analyzer or to an oscilloscope. If direct probing is not feasible, the signal may be coupled to the high speed probe 9220 through proximity capacitive coupling where the high speed probe 9220 is held in close proximity of several microns above the transimpedance amplifier output but is not required to make contact to the output. In this exemplary embodiment of FIG. 9, the testing system 9000 still relies on the auxiliary photodetector 700 to provide an excitation current to the input of the transimpedance amplifier which is not amenable to supporting direct electrical probing due to its sensitivity to parasitic capacitance.

Though FIG. 9 shows that the high speed probe 9220 comprises a single probe, it should be appreciated this configuration is merely for illustration purposes only. That is, in accordance with the various exemplary aspects of this invention, the high speed probe may consist of a plurality of probes, and that this invention is not limited to the shown single probe for providing output to the spectrum analyzer or oscilloscope.

Figure 10:
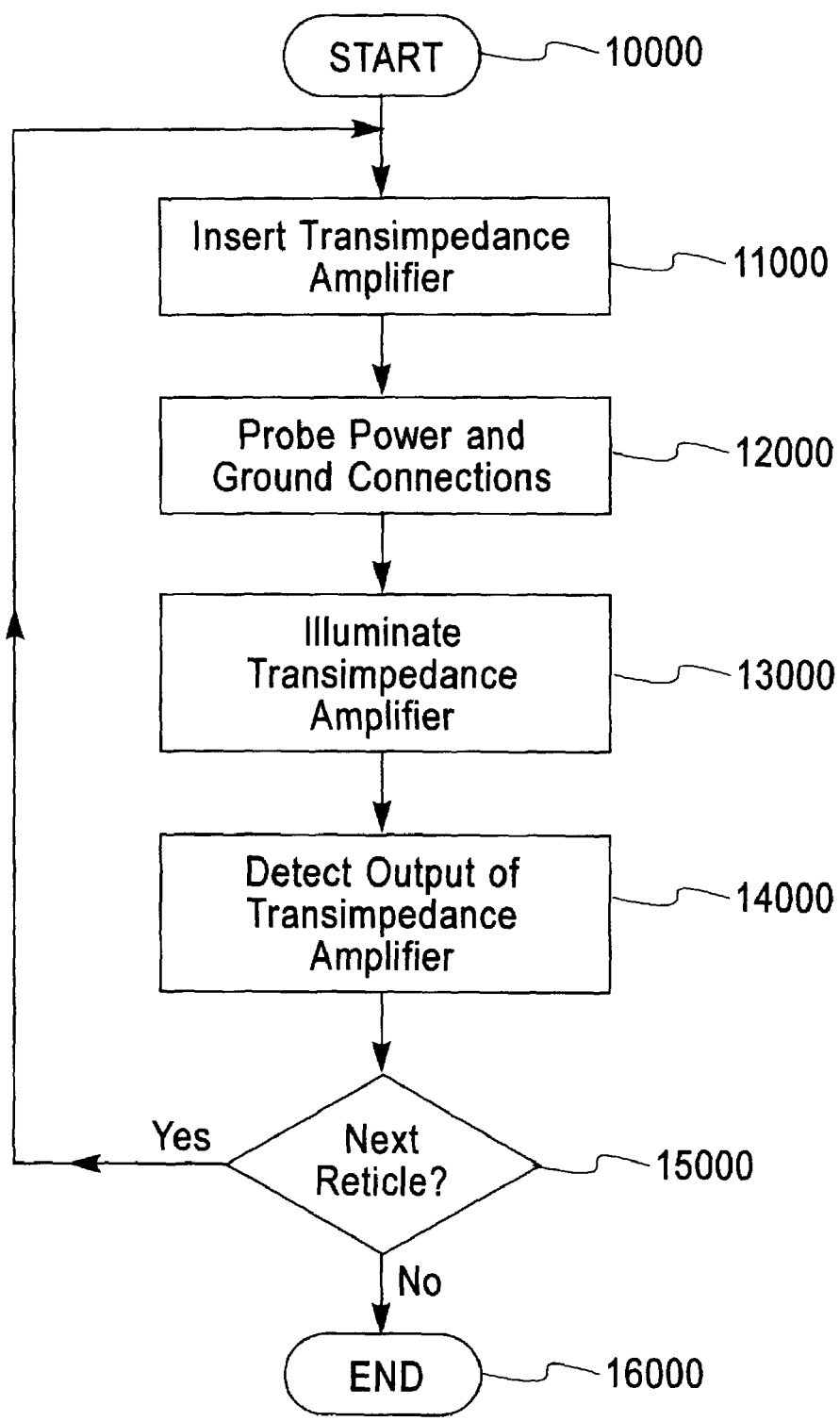
FIG. 10 shows a flowchart for testing a transimpedance amplifier in accordance with one exemplary aspect of the present invention.

FIG. 10 shows a flowchart of an exemplary method for testing a transimpedance amplifier according to the various exemplary aspects of the present invention. Beginning at step 10000, control proceeds to step 11000, where the amplifier wafer housing transimpedance amplifiers is inserted into the testing system. The probes 7400 (and 7620 or 8250 or 9220) are positioned over the reticle on the amplifier wafer 3000 that contains the next transimpedance amplifier to be tested. In the various exemplary aspects of the present invention, an auxiliary photodetector is provided on the amplifier wafer at the input of the transimpedance amplifier. Next, in step 12000, the power and ground and any required control connections on the amplifier wafer are probed. Control then proceeds to step 13000.

In step 13000, the amplifier wafer is illuminated. That is, focused and modulated laser beams are impinged upon the auxiliary photodetector on the amplifier wafer whereby the transimpedance amplifier is stimulated by the auxiliary photodetector. Next, in step 14000, the output of the amplifier wafer is detected for monitoring the transimpedance amplifier functionality. In various exemplary embodiments of this invention, the amplifier wafer is detected using one of a directional high gain antenna and sensitive narrow band receiver, or through a bias tee using a spectrum analyzer. The spectrum analyzer 7640 is then used to make a pass/fail decision.

Control then proceed to step 15000 where it is determined if there is another reticle on the amplifier wafer. If so, control returns to step 11000, where the process is to be repeated for testing the transimpedance amplifier in the next reticle on the amplifier wafer. If not, there are no more reticles on the amplifier wafer and thus there are no more transimpedance amplifiers to be tested, and control continues to step 16000, where the process ends.

In accordance with the exemplary aspects of this invention, the cost of testing a separately fabricated transimpedance amplifier, for example, which may be costly in the prior art when compared to a monolithic design, may be decreased. This may be most effective when the cost is exacerbated when fabricating arrays of transimpedance amplifiers due to the decreased yield associated with the multiplicity of circuits.

The foregoing description of the invention has been presented for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method of testing a transimpedance amplifier at wafer-level, comprising the steps of:
    inserting a transimpedance amplifier, the transimpedance amplifier comprising a substrate, an amplifier circuit formed on said substrate, a photodetector pad for connection to an external photodetector, and an auxiliary photodetector formed on said substrate adjacent to said amplifier circuit;
    probing power and ground connections of said transimpedance amplifier;
    illuminating said auxiliary photodetector with modulated laser light deflected by optical beam splitters; and
    detecting output of the transimpedance amplifier.

2. The method according to claim 1, wherein said output is detected using a high speed electrical probe by either direct contact or capacitive proximity coupling.

3. The method according to claim 1, wherein said output is detected using a directional high gain antenna and a sensitive narrow band receiver.

4. The method according to claim 1, wherein said output is detected by probing a supply voltage of the transimpedance amplifier and detecting switching currents passing through a bias tee using a spectrum analyzer.

5. The method according to claim 1, wherein said transimpedance amplifier comprises an array of transimpedance amplifiers.

6. The method according to claim 5, wherein said illuminating said auxiliary photodetector further comprises selectively illuminating individual auxiliary photodetectors with modulated laser light deflected by said optical beam splitters.

7. The method according to claim 6, wherein said laser light is steered to selectively illuminate said auxiliary photodetectors without moving said power and ground connections of said transimpedance amplifiers.

8. The method according to claim 6, further comprising applying beams having different frequencies while being within a passband of the transimpedance amplifier.

9. A testing system for testing a transimpedance amplifier at wafer-level, the transimpedance amplifier comprises a substrate, an amplifier circuit formed on said substrate, a photodetector pad for connection to an external photodetector, and an auxiliary photodetector formed on said substrate adjacent to said amplifier circuit, the testing system comprising:
    at least one probe for probing power and ground connections of said transimpedance amplifier;
    an illumination system comprising optical beam splitters for illuminating said auxiliary photodetector with modulated laser light deflected by said optical beam splitters; and
    a detection device for detecting output of the transimpedance amplifier.

10. The system according to claim 9, wherein said detection device comprises a high speed electrical probe by either direct contact or capacitive proximity coupling.

11. The system according to claim 9, wherein said detection device comprises a directional high gain antenna and a sensitive narrow band receiver.

12. The system according to claim 9, wherein said detection device comprises a bias tee, and said output is detected by probing a supply voltage of the transimpedance amplifier and detecting switching currents passing through a bias tee using a spectrum analyzer.

13. The system according to claim 9, wherein said transimpedance amplifier comprises an array of transimpedance amplifiers.

14. The system according to claim 13, wherein the modulated laser light deflected by said optical beam splitters selectively illuminate individual auxiliary photodetectors.

15. The system according to claim 13, wherein said laser light is steered to selectively illuminate said auxiliary photodetectors without moving said optical beam splitters or said probe.

16. The system according to claim 13, wherein said laser light comprises beams having different frequencies while being within a passband of the transimpedance amplifier.

* * * * *